US007311329B2

(12) United States Patent
Mulhern

(10) Patent No.: US 7,311,329 B2
(45) Date of Patent: Dec. 25, 2007

(54) ANTI-TIP WHEEL FOR A WHEELCHAIR

(75) Inventor: James P. Mulhern, Nanticoke, PA (US)

(73) Assignee: Pride Mobility Products Corporation PA (US)

( * ) Notice: Subject to any disclaimer, the term of this patent is extended or adjusted under 35 U.S.C. 154(b) by 395 days.

(21) Appl. No.: 10/849,654

(22) Filed: May 20, 2004

(65) Prior Publication Data

US 2004/0232683 A1 Nov. 25, 2004

Related U.S. Application Data

(60) Provisional application No. 60/473,361, filed on May 23, 2003.

(51) Int. Cl.
*B60R 21/00* (2006.01)

(52) U.S. Cl. .......................... 280/755; 16/18 R; 16/21; 16/26; 16/28; 180/907; 301/37.101; 301/37.42

(58) Field of Classification Search ................ 280/755, 280/304.1, 5.2; 180/907; 301/5.23, 36.1, 301/36.2, 37.101, 37.42; 16/18 R, 45, 21, 16/47, 24, 26, 28, 31 R See application file for complete search history.

(56) References Cited

U.S. PATENT DOCUMENTS 3,001,601 A 9/1961 Aghnides
3,040,371 A * 6/1962 Rice et al. .................. 16/31 R
3,127,632 A * 4/1964 Rice et al. .................. 16/18 R
3,212,594 A 10/1965 Scott
3,381,973 A 5/1968 Carr
3,424,259 A 1/1969 Aghnides
3,695,375 A 10/1972 Splawinski
3,746,112 A 7/1973 Ilon
3,821,995 A 7/1974 Aghnides
3,861,435 A 1/1975 Vincent et al.
4,119,163 A 10/1978 Ball (Continued)

FOREIGN PATENT DOCUMENTS

FR 2 473 423 7/1981

(Continued)

OTHER PUBLICATIONS

Commercially available wheelchair anti-tip wheel, Invacare Corporation. Figs. 1-4, date unknown, admitted to be prior art.

(Continued)

*Primary Examiner*—Eric Culbreth
(74) *Attorney, Agent, or Firm*—DLA Piper US LLP

(57) ABSTRACT

A wheelchair is provided with front anti-tip wheels adapted to assist the wheelchair in mounting an obstacle that the wheelchair approaches obliquely. The anti-tip wheels may function as casters, capable of rotating about a vertical axis, or may be fixed for rotation about a horizontal axis only. The anti-tip wheels may include lateral convex surfaces which tend to allow the anti-tip wheel to slide or roll over the obstacle. The lateral convex surfaces may be provided by a laterally oriented rolling element, a convex-shaped hub, a convex-shaped housing that partially surrounds the wheel, or a ball-shaped wheel. Alternatively, rotation of the anti-tip wheel may be controlled such that the wheel rolling surface faces and engages the obstacle.

17 Claims, 13 Drawing Sheets

U.S. PATENT DOCUMENTS

| | | | |
|---|---|---|---|
| 4,353,428 A | 10/1982 | Kovar et al. | |
| 4,375,295 A | 3/1983 | Yolin | 280/289 |
| 4,400,032 A | 8/1983 | dePolo | |
| 4,566,707 A | 1/1986 | Nitzberg | |
| 4,592,570 A | 6/1986 | Nassiri | |
| 4,618,155 A | 10/1986 | Jayne | |
| 4,733,737 A | 3/1988 | Falamak | |
| 4,785,899 A | 11/1988 | von Winckelmann | |
| 4,811,966 A | 3/1989 | Singleton | |
| 4,926,952 A | 5/1990 | Farnam | |
| 4,958,651 A | 9/1990 | Najm | |
| 4,995,679 A | 2/1991 | Segerljung | |
| 5,186,270 A | 2/1993 | West | |
| 5,249,636 A | 10/1993 | Kruse et al. | |
| 5,275,248 A | 1/1994 | Finch et al. | |
| 5,323,867 A | 6/1994 | Griffin et al. | |
| 5,374,879 A | 12/1994 | Pin et al. | |
| 5,383,715 A | 1/1995 | Homma et al. | |
| 5,401,045 A | 3/1995 | Foerster et al. | |
| 5,445,233 A | 8/1995 | Fernie et al. | |
| 5,513,716 A | 5/1996 | Kumar et al. | |
| 5,593,174 A | 1/1997 | Graziano et al. | |
| 5,649,605 A | 7/1997 | Rønne et al. | |
| 5,697,465 A | 12/1997 | Kruse | |
| 5,927,423 A | 7/1999 | Wada et al. | |
| 5,950,749 A | 9/1999 | Inoue | |
| 5,964,473 A * | 10/1999 | Degonda et al. | 280/250.1 |
| 6,079,510 A | 6/2000 | Miyamoto | |
| 6,135,228 A | 10/2000 | Asada et al. | |
| 6,202,773 B1 | 3/2001 | Richey, II et al. | 180/6.5 |
| 6,428,020 B1 | 8/2002 | Steadman | |
| 6,474,434 B1 | 11/2002 | Bech | |
| 6,752,230 B1 | 6/2004 | Huang | 108/209 |

FOREIGN PATENT DOCUMENTS

| | | |
|---|---|---|
| GB | 2 192 595 | 1/1988 |
| WO | WO 98/02122 | 1/1998 |
| WO | WO 00/54718 | 9/2000 |

OTHER PUBLICATIONS

Commercially available wheelchair anti-tip wheel, Pride Mobility, Inc., Figs. 5-7, date unknown, admitted to be prior art.

Invacare Corporation, Parts Catalog, *Storm Series® TDX™, TDX™4, TDX™5 Powered Wheelchairs*, Apr. 23, 2004, (Cover page and p. 38, "Caster, 6" Front and Rear").

Invacare Corporation, Parts Catalog, *Xterra™GT™ Powered Wheelchair*, Apr. 1, 2004, (Cover and page and p. 73 "Front 8 and Rear 6" Caster Assembly").

Acroname, Inc., "*Using an Omni-directional Wheel as a Caster*," date unknown.

* cited by examiner

ANTI-TIP WHEEL FOR A WHEELCHAIR

CROSS-REFERENCE TO RELATED APPLICATIONS

This application claims benefit of the filing date of U.S. Provisional Patent Application 60/473,361, "Improvements in or Relating To Wheelchairs", filed May 23, 2003, the subject matter of which is incorporated herein by reference.

BACKGROUND OF THE INVENTION

The present invention relates to wheelchairs, and especially to anti-tip wheels used on power wheelchairs.

A conventional mid-wheel drive power wheelchair, such as that illustrated in FIGS. 1 and 2, typically rests on two drive wheels, one on each side, close to a position directly below the center of gravity, and one or more caster wheels at the back. Many such wheelchairs are also provided with one or more anti-tip wheels at the front to prevent the wheelchair from tipping forward and/or to assist it in climbing curbs and other obstacles.

The front anti-tip wheels may be casters that normally rest on the ground, or may be wheels that are normally above ground. The anti-tip wheels may be fixed, resiliently mounted, or connected to the drive wheel suspensions so as to move up and down actively in response to movement of the vehicle. Examples of wheelchair suspension systems incorporating anti-tip wheels are shown in commonly-assigned U.S. Pat. No. 6,129,165 (Schaffner et al.) and U.S. Pat. No. 5,944,131 (Schaffner et al.).

When a wheelchair approaches an obstacle having a generally vertical face, such as a curb, the front anti-tip wheels are intended to ride up and over the obstacle, lifting the front of the wheelchair and assisting the wheelchair in climbing the obstacle. However, if the wheelchair approaches the obstacle at an oblique approach angle $\alpha$, as illustrated in FIG. 2, conventional anti-tip wheels may tend to slide along the vertical face of the obstacle rather than mounting it. This effect may be accentuated where the anti-tip wheel is a caster. The flatter the angle $\alpha$ at which the wheelchair approaches the obstacle, the more likely the problem is to arise. Further, as the wheelchair continues to approach the obstacle, the sliding action tends to turn the wheelchair so that it is aligned along the obstacle, exacerbating the problem.

It is therefore an object of the invention to provide an obstacle-climbing wheelchair with front anti-tip wheels that are more likely to mount the obstacle, and less likely to slide along it, when the wheelchair approaches the obstacle at an oblique approach angle $\alpha$.

SUMMARY OF THE INVENTION

In a first aspect, the invention is a wheelchair comprising a frame and at least a first anti-tip wheel, supported by the frame for rotation about an axis of rotation. The anti-tip wheel includes at least a first side and an outer wheel portion adapted for rolling contact with a supporting surface. At least a first hub portion extends from the first side laterally along the axis of rotation and has a convex outer surface having a vertex positioned along the wheel axis of rotation. The hub portion has an outer perimeter directly connected to the outer wheel portion. When the hub portion contacts an obstacle at a height less than a height of the vertex, interaction of the outer surface and the obstacle facilitates movement of the anti-tip wheel over the obstacle.

Preferably, the outer wheel portion includes a generally planar surface having at least one edge, and the hub outer perimeter connects directly to the outer wheel portion at the first edge. The wheelchair may further comprise first and second lateral sides with the first anti-tip wheel disposed on the first lateral side of the wheelchair and a second anti-tip wheel disposed on the second lateral side of the wheelchair.

The anti-tip wheel may further include a second side and a second hub portion extending from the second side laterally along the axis of rotation. The outer surface may be a portion of a sphere. The anti-tip wheel may include a first wheel portion and a second wheel portion, the first portion being mounted on the wheel first side, the second portion being mounted on the wheel second side, and the first and second portions each being mounted to a common axle, wherein the frame connects to the axle at a location between the first and second wheel portions.

The anti-tip wheel may or may not contact the supporting surface when the wheelchair is in a normal operative position and the supporting surface is level. The anti-tip wheel may function as a caster, capable of rotation about a generally vertical axis, or may be fixed for rotation about a generally horizontal axis only.

In a second aspect, the invention is a wheelchair comprising a frame and at least a first anti-tip wheel supported by the frame for rotation about a first axis of rotation. The anti-tip wheel has an outer portion adapted for rolling contact with a supporting surface. A hub portion is connected to and extends laterally from the wheel and has a convex outer surface with a vertex located along the axis of rotation and an outer perimeter proximate the wheel outer portion. A portion of the outer surface is proximate the outer perimeter and defines a line which is tangent to both the portion of the outer surface and to an outer extent of the wheel such that when the hub portion contacts an obstacle at a height less than a height of the vertex, interaction of the outer surface and the obstacle facilitates movement of the wheel over the obstacle. Preferably, the hub portion is releasably connected to the wheel with at least one mechanical fastener, such as a screw.

In a third aspect, the invention is a wheelchair comprising a frame and at least a first anti-tip wheel supported by the frame for rotation about an axis of rotation. The wheel has an outer portion adapted for rolling contact with a supporting surface. The wheel has at least a first side. At least a first housing is connected to the frame. The first housing partially surrounds the anti-tip wheel. At least a portion of the housing extends laterally beyond the first side. The first housing includes a convex outer surface with a vertex positioned at a first height and an outer perimeter proximate the wheel outer portion. A portion of the outer surface is proximate the outer perimeter and defines a tangent line tangent to both the portion of the outer surface and an outer extent of the wheel such that when the first housing contacts an obstacle at a height less than the first height, the interaction of the outer surface and the obstacle facilitates movement of the wheel over the obstacle. Preferably, the wheelchair comprises a second housing extending laterally beyond a second side of the anti-tip wheel. Preferably, the first height is positioned above a height of the axis of rotation.

In a fourth aspect, the invention is a wheelchair comprising a frame and at least one anti-tip wheel supported by the frame for rotation about a first wheel axis of rotation. The wheelchair includes at least one rolling element, supported by the frame for rotation about at least one rolling element axis of rotation positioned at a first height. The rolling element has a convex outer surface and is mounted adjacent to and laterally of the at least one anti-tip wheel. When the outer surface engages an obstacle having a height less than the first height, interaction of the outer surface with the obstacle facilitates movement of the wheel over the obstacle.

The anti-tip wheel has a wheel diameter. Preferably, the rolling element is contained entirely within a circular cylindrical envelope having an diameter equal to the wheel diameter and extending laterally from the anti-tip wheel along the first wheel axis of rotation. The rolling element may be ball-shaped or may be cylindrical. The cylindrical rolling element axis of rotation is preferably oriented transverse to the first wheel axis of rotation.

In a fifth aspect, the invention is a wheelchair comprising a wheelchair frame and at least a first ball-shaped anti-tip wheel. A wheel mount is rigidly connected to the wheelchair frame and bearings are rotatably coupled to the wheel mount. The ball-shaped anti-tip wheel is retained within the wheel mount by the bearings for free rotation relative to the wheel mount.

Preferably, the ball-shaped anti-tip wheel includes a magnetic material, the wheel mount includes a magnet, and the anti-tip wheel is retained in the wheel mount magnetically. Alternatively, the wheel mount may extend over a sufficient portion of the anti-tip wheel to mechanically retain the anti-tip wheel within the wheel mount.

In yet a sixth aspect, the invention is a wheelchair comprising a wheelchair frame and a power source. At least a first anti-tip wheel assembly is supported by the wheelchair frame, and includes a wheel frame mounted for rotation about a generally vertical axis. A wheel mounted is in the wheel frame for rotation about a generally horizontal axis. A motor is operatively coupled to the power source and to the wheel frame for rotation of the wheel frame. A sensor is provided for detecting motion of the wheelchair and direction of the motion. A controller is operatively coupled to the power source, the sensor and the motor to control operation of the motor to control rotation of the wheel frame in response to information received from the sensor.

Preferably, the motor is a stepping motor and the sensor is a gyroscopic sensor responsive to turning of the wheelchair. A user control for operating said wheelchair may comprise the sensor.

The basic aspects of the present invention may be combined in a number of forms. The preferred aspects of the various constructions may be used in conjunction with one another or used alone. The various features provide certain advantages over the prior art. These advantages will be described herein and will be understood by those skilled in the art upon reviewing the description and drawings.

BRIEF DESCRIPTION OF THE DRAWINGS

For the purpose of illustrating the invention, there are shown in the drawings forms of the invention which are presently preferred; it being understood, however, that this invention is not limited to the precise arrangements and instrumentalities shown. In the drawings.

DETAILED DESCRIPTION OF THE INVENTION

Figure 1:
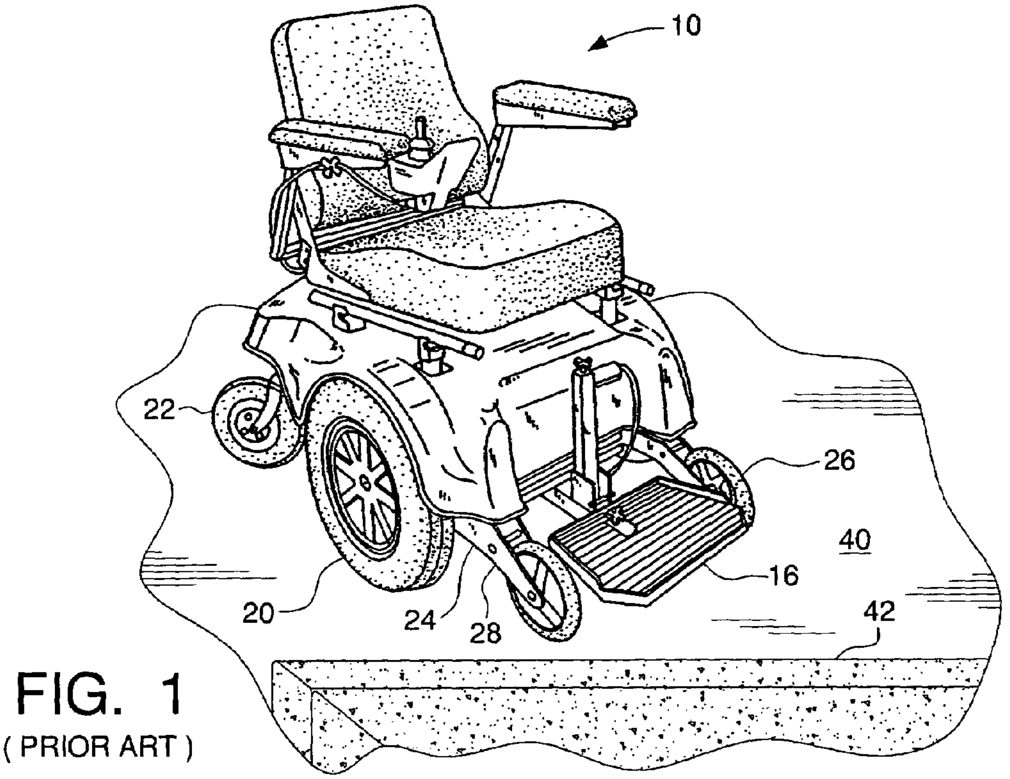
FIG. 1 ( PRIOR ART )
FIG. 1 is a perspective view of a prior art wheelchair shown approaching a curb.
Figure 2:
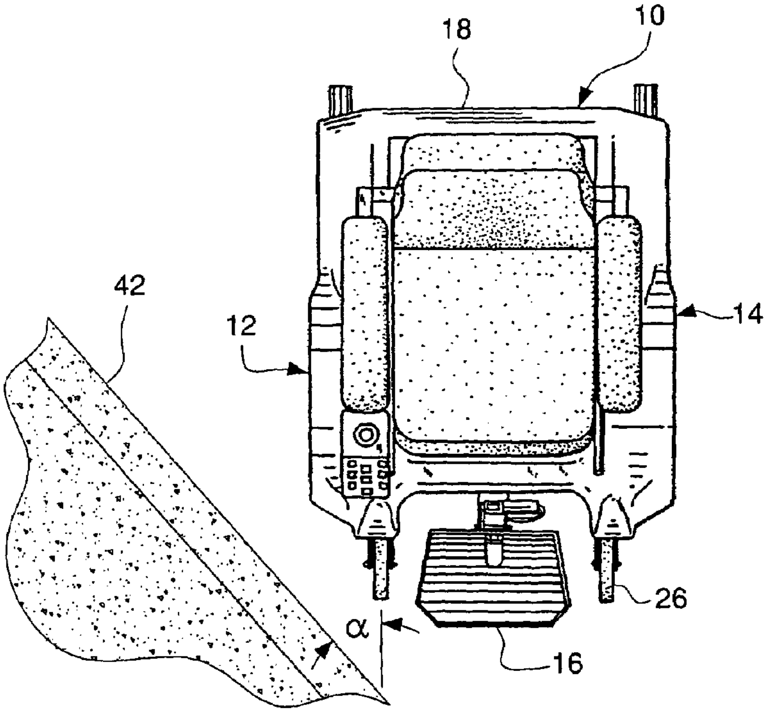
FIG. 2 ( PRIOR ART )
FIG. 2 is a top plan view of the prior art wheelchair of FIG. 1.

Referring to the drawings, and initially to FIGS. 1 and 2, a conventional mid-wheel-drive curb climbing power wheelchair is indicated generally by the reference numeral 10. The wheelchair has first and second lateral sides 12 and 14, respectively, a front end 16 and a rear end 18. The wheelchair 10 is supported by a pair of drive wheels 20 and a pair of rear casters 22. The wheelchair 10 includes a frame 24 to which the drive wheels 20 and rear casters 22 are attached.

The wheelchair may be provided with a seat for a user, motors, batteries to provide power to the motor, a joystick to control the motors, and the like. These features are known from, for example, above-mentioned U.S. Pat. No. 6,129,165, which is herein incorporated by reference in its entirety. In the interest of conciseness, these features are not further described here.

Proximate the front end 16 of the wheelchair 10 are a pair of conventional, prior art anti-tip wheels 26. When the wheelchair 10 is in a normal operative position and is supported by a horizontal supporting surface 40, the prior art anti-tip wheels 26 are positioned above the supporting surface 40. It is also known in the prior art to provide anti-tip wheels which contact the supporting surface 40 when the wheelchair 10 is in a normal operative position. The prior art anti-tip wheels 26 are preferably mounted to support arms 28. The support arms 28 may be movable up and down, for example, by the mechanisms disclosed in above-mentioned U.S. Pat. Nos. 5,944,131 and 6,129,165 and schematically illustrated in FIGS. 3 and 4, respectively. The support arms 28 may be pivotally mounted relative to other components about pivot points 30.

Figure 5:
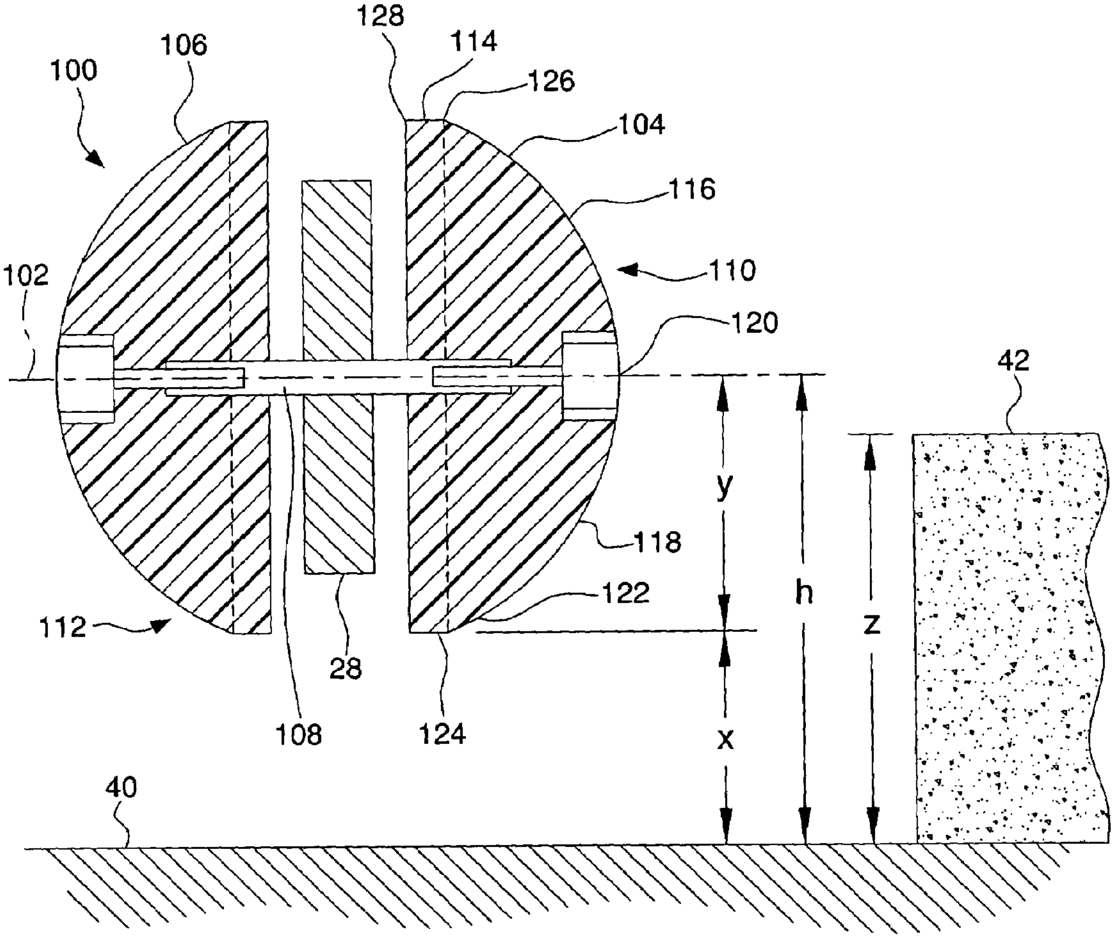
FIG. 5 is a partially schematic, partial cross-sectional view of the first preferred embodiment of the anti-tip wheel of FIGS. 3 and 4, taken along line 5-5 of FIG. 3.

As discussed above, in operation the prior anti-tip wheels 26 may exhibit difficulties in scaling an obstacle 42, such as a curb, having a height z (see FIG. 5). More particularly, if the wheelchair approaches the obstacle 42 at an oblique approach angle α, as illustrated in FIG. 2, the prior art anti-tip wheels 26 may tend to slide along the obstacle 42 rather than mounting it if the obstacle height z is sufficiently large and the approach angle α is sufficiently shallow.

Figure 3:
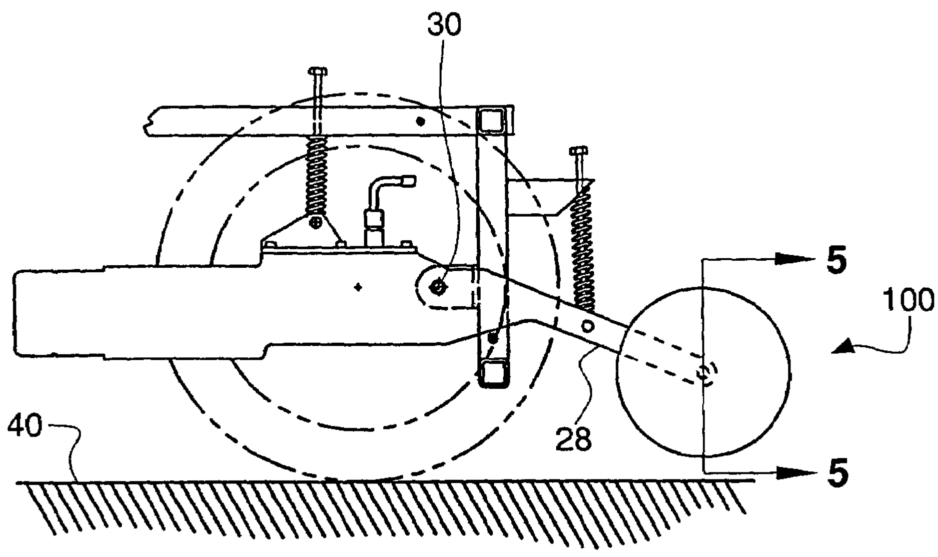
FIG. 3 is a broken schematic side view of a prior art wheelchair suspension apparatus having forward anti-tip wheels and incorporating a first preferred embodiment of an anti-tip wheel in accordance with the present invention.
Figure 4:
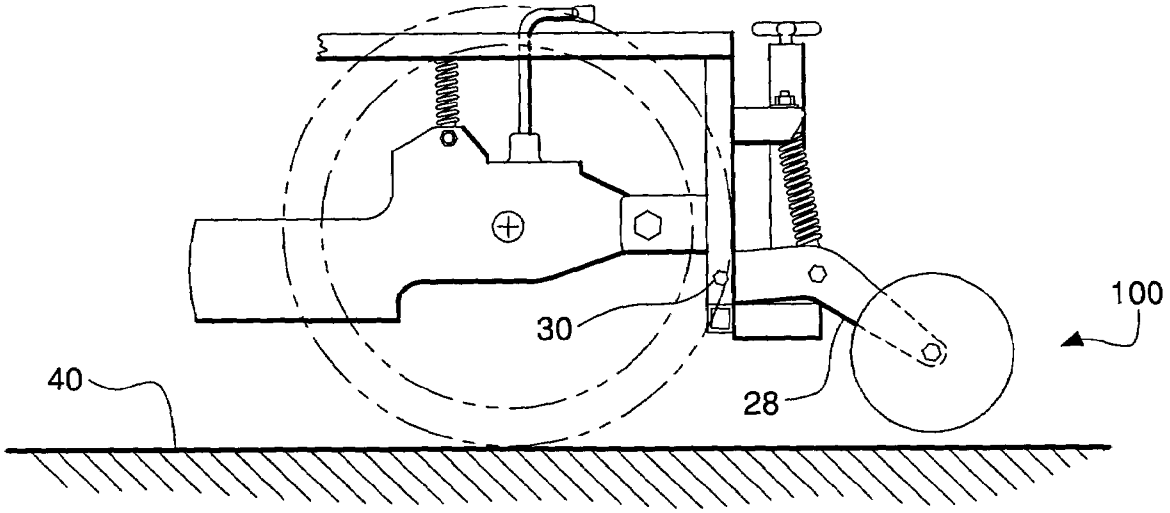
FIG. 4 is a broken schematic side view of a second prior art wheelchair suspension apparatus having forward anti-tip wheels and also incorporating the first preferred embodiment of the anti-tip wheel.

A first embodiment of an anti-tip wheel assembly 100 is shown in FIGS. 3-5. The anti-tip wheel assembly 100 is supported by the wheelchair frame 24 generally and in particular by the support arm 28 for rotation about an axis of rotation 102. The anti-tip wheel assembly 100 preferably includes first and second wheel portions 104 and 106, respectively, mounted to and connected by an axle 108. Further preferably, the support arm 28 connects to the axle 108 at a location between the first and second wheel portions 104, 106. The anti-tip wheel assembly 100 has a first side 110 and a second side 112 and an outer wheel portion 114 adapted for rolling contact with the supporting surface 40. A first hub portion 116 extends from the first side 110 laterally along the axis of rotation 102. The first hub portion 116 has a convex outer surface 118 having a vertex 120 positioned along the axis of rotation 102. While any convex surface of rotation could be employed as the outer surface 118, a preferred shape of the outer surface is a portion of a sphere. The first hub portion 116 has an outer perimeter 122 directly connected to the outer wheel portion 114.

As discussed above, the anti-tip wheel assembly 100 may be mounted to the wheelchair 10 such that the anti-tip wheel assembly 100 is elevated above the supporting surface 40. The height of this elevation is shown in FIG. 5 to be an elevation height x. The distance between the outermost extent of the outer wheel portion 114 and the hub vertex 120 (as well as the axis of rotation 102) is a wheel radius y. Thus, the vertex 120 is positioned above the supporting surface 40 at an overall height h, where h=x+y.

In the preferred embodiment illustrated, the outer wheel portion 114 includes a generally planar surface 124 having a first edge 126 and a second edge 128. The hub outer perimeter 122 connects directly to the outer wheel portion 114 at the first edge 126. Furthermore, the wheelchair 10 is preferably provided with first and second anti-tip wheels 100, the first anti-tip wheel assembly 100 disposed on the first lateral side 12 of the wheelchair 10 and a second anti-tip wheel assembly 100 disposed on the second lateral side 14 of the wheelchair 10.

In use, when the hub portion contacts an obstacle 42 at a height z less than the overall height h, a corner of the obstacle 42 tends to slide down along the convex outer surface 118 as the anti-tip wheel assembly 100 is pushed up and over the obstacle 42. Thus, interaction of the outer surface 118 and the obstacle 42 facilitates movement of the anti-tip wheel assembly 100 over the obstacle 42. Furthermore, depending upon the approach angle α, when the wheelchair 10 is climbing an obstacle 42, the anti-tip wheel assembly 100 on the side of the wheelchair 10 nearer the obstacle 42 first mounts the obstacle 42, possibly followed by the drive wheel 20 on the same side. Subsequently, the other anti-tip wheel assembly 100 will also meet and need to mount the obstacle 42, followed by the drive wheel 20 on the opposing side. To ensure that both anti-tip wheels 100 can mount the curb successfully, the first and second wheel portions 104, 106 are preferably provided on both sides 110, 112 of each anti-tip wheel assembly 100, each wheel assembly 100 having hubs 116 including convex outer surfaces 118.

The hub outer surface 118 will be effective when the height z of the obstacle 42 is above the bottom of the anti-tip wheel assembly 100 and is far enough below the vertex 120 and axis of rotation 102 such that the portion of the outer surface 118 that initially contacts an upper extent of the obstacle 42 is angled substantially away from the vertical. More particularly, the hub extension outer surface 118 will be effective when an upwardly directed force between the outer surface 118 and the obstacle 42 (generated by the motive force of the wheelchair 10) is sufficiently large to overcome the frictional force (or other forces) resisting movement of the wheel assembly 100 up and over the obstacle 42.

From this disclosure, the artisan will recognize that the anti-tip wheel assembly 100 need not be shaped exactly as illustrated in FIG. 5. For example, the outer wheel portion 114 could be a continuation of the hub, forming a hemisphere without the generally planar surface 124. It is preferred, however, that the ground-contacting portion of the outer wheel portion 114 be formed by a surface substantially parallel to the axis of rotation 102. If the ground-contacting portion of the outer wheel portion 114 is formed by edges of substantially sloped surfaces, it will tend to wear or become damaged, and may tend to mark or damage supporting surfaces 40 over which the wheelchair 10 operates.

Figure 6A:
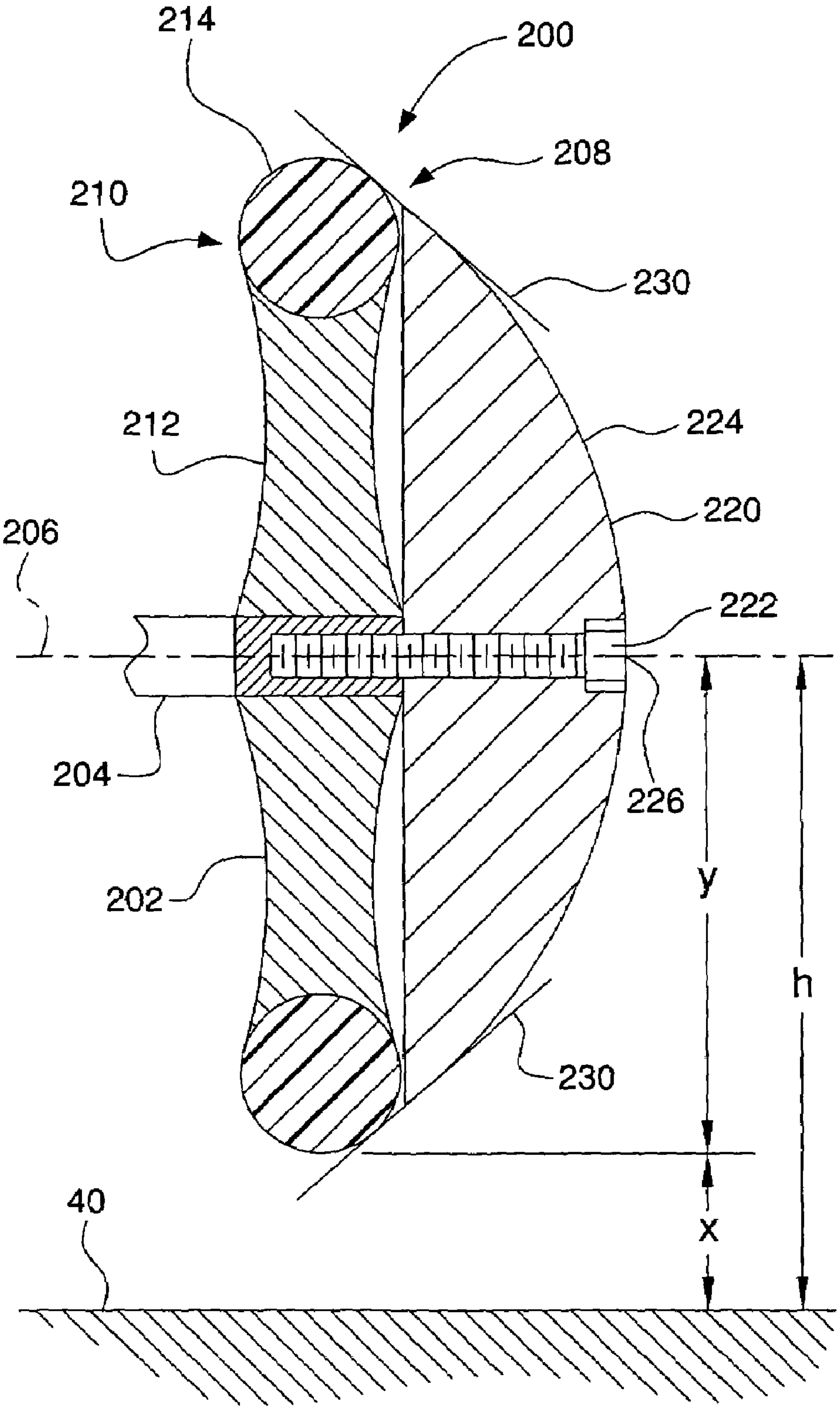
FIG. 6A is a partial cross-sectional view of a second preferred embodiment of an anti-tip wheel in accordance with the present invention.

Referring now to FIG. 6A, a second preferred embodiment of an anti-tip wheel assembly 200 comprises a wheel 202, which may be a conventional anti-tip wheel, adapted to receive a hub extension 220. The wheel 202 is supported by the wheelchair frame 24 generally and preferably by the support arm 28 on an axle 204 for rotation about an axis of rotation 206. The wheel 202 has first and second sides 208 and 210, respectively. The wheel 202 includes a hub 212 and an outer wheel portion 214 adapted for rolling contact with the supporting surface 40. The outer wheel portion 214 of the wheel 202 has an outer extent. The hub extension 220 is connected to the hub 212, and extends laterally from the wheel 202 on the first side 208. Preferably, the hub extension 220 is releasably connected to the hub 212 by a conventional fastener, such as a screw 222.

The hub extension 220 has a convex outer surface 224 having a vertex 226 preferably positioned along the axis of rotation 206. The outer surface 224 includes an outer perimeter proximate the wheel outer portion 214. A portion of the outer surface 224 proximate the outer perimeter defines a line 230 which is tangent to both the portion of the outer surface 224 and to the outer extent of the wheel 202.

As discussed relative to the first preferred embodiment, the second preferred embodiment anti-tip wheel assembly 200 similarly may be mounted to the wheelchair 10 such that the anti-tip wheel assembly 200 is elevated above the supporting surface 40. The height of this elevation is shown in FIG. 6A to be elevation height x. The distance between the outermost extent of the outer wheel portion 214 and the hub vertex 226 (as well as the axis of rotation 206) is a wheel radius y. Thus, the vertex 226 is positioned above the supporting surface 40 at overall height h, where h=x+y.

In use, the second preferred embodiment of the anti-tip wheel assembly 200 functions very similarly to the first preferred embodiment anti-tip wheel assembly 100. That is, when the outer surface 224 of the hub extension 220 contacts an obstacle 42 at a height z less than the overall height h, a corner of the obstacle 42 tends to slide down along the convex outer surface 224 as the anti-tip wheel assembly 200 is pushed up and over the obstacle 42. Thus, interaction of the outer surface 224 and the obstacle 42 facilitates movement of the anti-tip wheel assembly 200 over the obstacle 42. Hub extensions 220 with convex outer surfaces 224 may be provided on both sides 208, 210 of each anti-tip wheel 202.

Figure 6B:
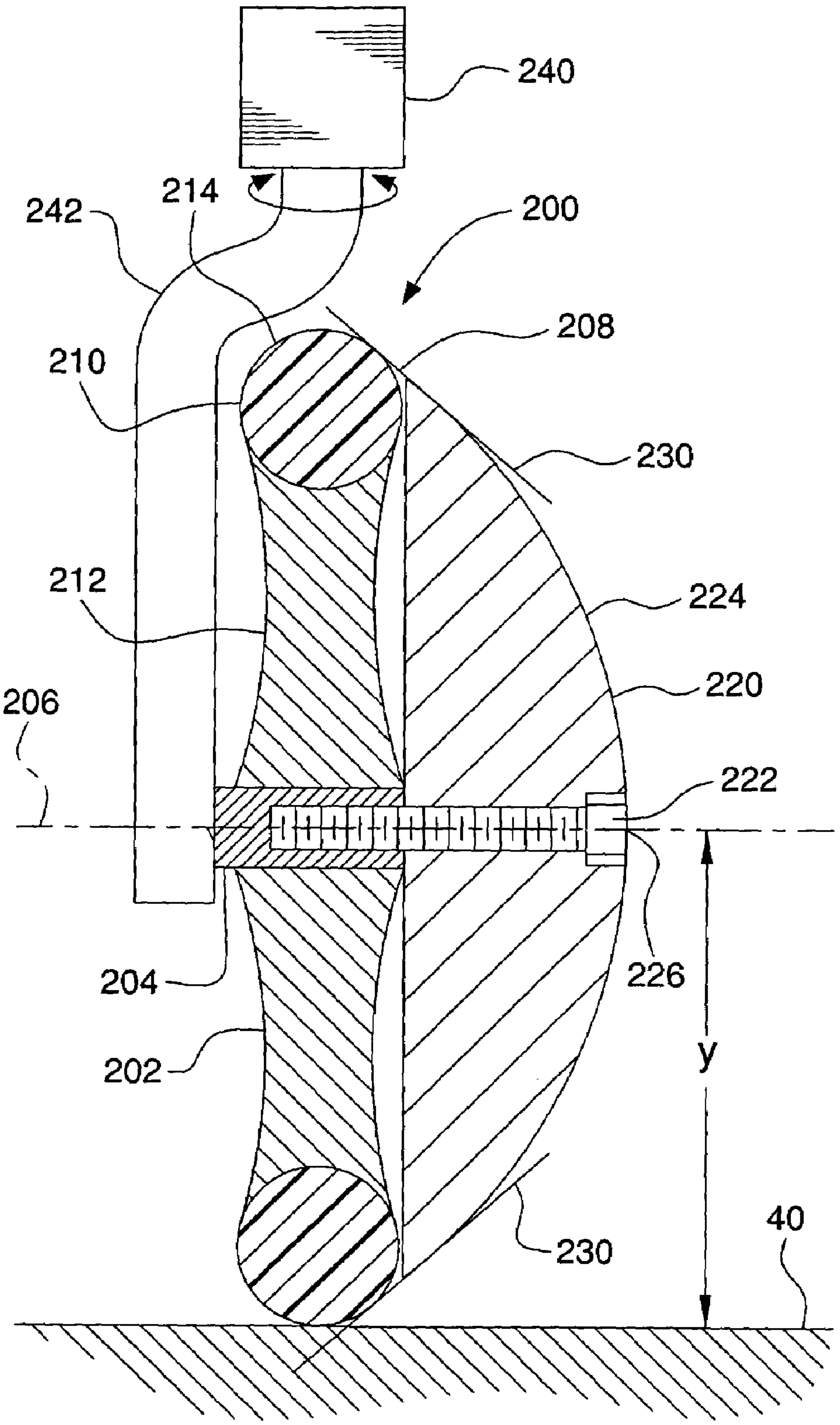
FIG. 6B is a partially schematic, partial cross-sectional view of a third preferred embodiment of an anti-tip wheel in accordance with the present invention.

Referring now to FIG. 6B, a third preferred embodiment of the anti-tip wheel assembly 200' closely resembles the second preferred embodiment anti-tip wheel assembly 200, yet the wheel 202 is supported for rotation about a generally vertical axis, allowing the third preferred embodiment 200' to function as a caster. The third preferred embodiment 200' includes a caster support arm 242 supported for rotation at a first end in a mount 240. At a second end, the support arm 242 is connected to wheel axle 204. In use, the third preferred embodiment anti-tip wheel assembly 200' operates generally similarly to the second preferred embodiment 200. However, the wheel 202 of the third embodiment 200' preferably rests upon the supporting surface 40 during normal operation of the wheelchair 10 and is free to pivot about the generally vertical axis.

Figure 7:
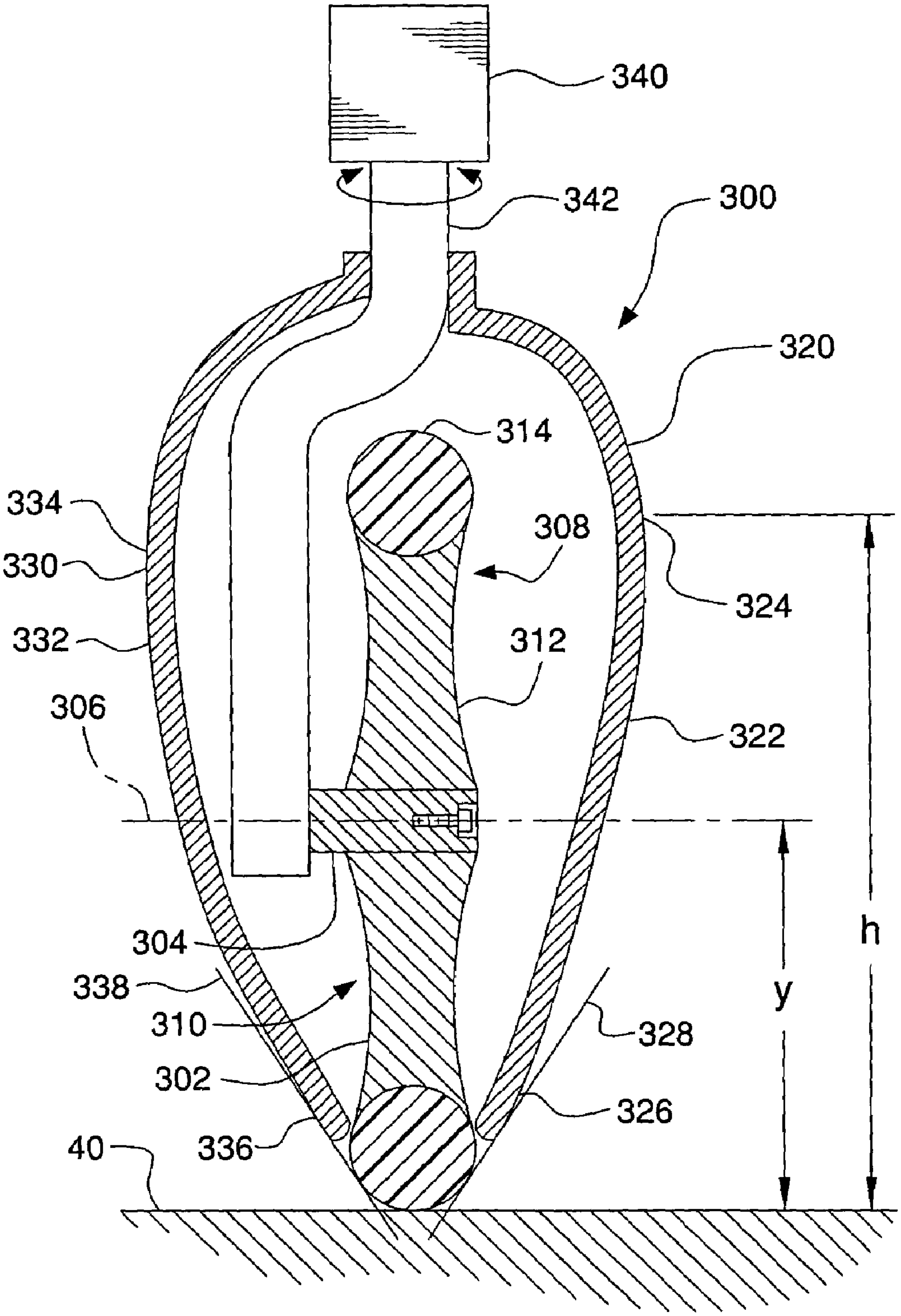
FIG. 7 is a partially schematic, partial cross-sectional view of a fourth preferred embodiment of an anti-tip wheel in accordance with the present invention.

Referring now to FIG. 7, a fourth preferred embodiment of an anti-tip wheel assembly 300 comprises a wheel 302, which may be a conventional anti-tip wheel. The wheel 302 is supported by the wheelchair frame 24 generally and preferably by a support arm 342. At a first end, the support arm 342 connects to an axle 304 and at a second end is supported for rotation in a mount 340. The fourth preferred embodiment anti-tip wheel assembly 300 thus preferably functions as a caster. From this disclosure, the artisan will recognize that the wheel 302 need not be mounted for rotation about a generally vertical axis.

Axle 304 supports the wheel 302 for rotation about an axis of rotation 306. The wheel 302 has first and second sides 308 and 310, respectively. The wheel 302 includes a hub 312 and an outer wheel portion 314 adapted for rolling contact with the supporting surface 40. The outer wheel portion 314 of the wheel 302 has an outer extent. At least a first housing 320 is connected to the frame 24, and partially surrounds the anti-tip wheel 302. The first housing 320 has a convex outer surface 322 with a vertex 324 positioned at a first height h and an outer perimeter 326 proximate the wheel outer portion 314. A portion of the outer surface 322 proximate the outer perimeter 326 defines a tangent line 328 tangent to both the portion of the outer surface and a portion of the outer extent of the wheel 302.

A second housing 330 may be provided. The second housing 330 is generally similar to the first housing 320, having a convex outer surface 332 with a vertex 334 preferably positioned at the first height h. The second housing 330 further includes an outer perimeter 336 proximate the wheel outer portion 314. As with the first housing 320, a portion of the outer surface 332 proximate the outer perimeter 336 defines a tangent line 338 tangent to both the portion of the outer surface and a portion of the outer extent of the wheel 302.

In use, the fourth preferred embodiment of the anti-tip wheel assembly 300 functions very similarly to the first and second preferred embodiment anti-tip wheels 100 and 200, with the exception that the fourth embodiment vertex 324 (and vertex 334, if the second housing is provided) is preferably positioned well above the axis of rotation 306, and thus the fourth embodiment anti-tip wheel assembly 300 is operative for higher obstacle heights z to assist the wheelchair 10 over the obstacle 42.

Figure 8:
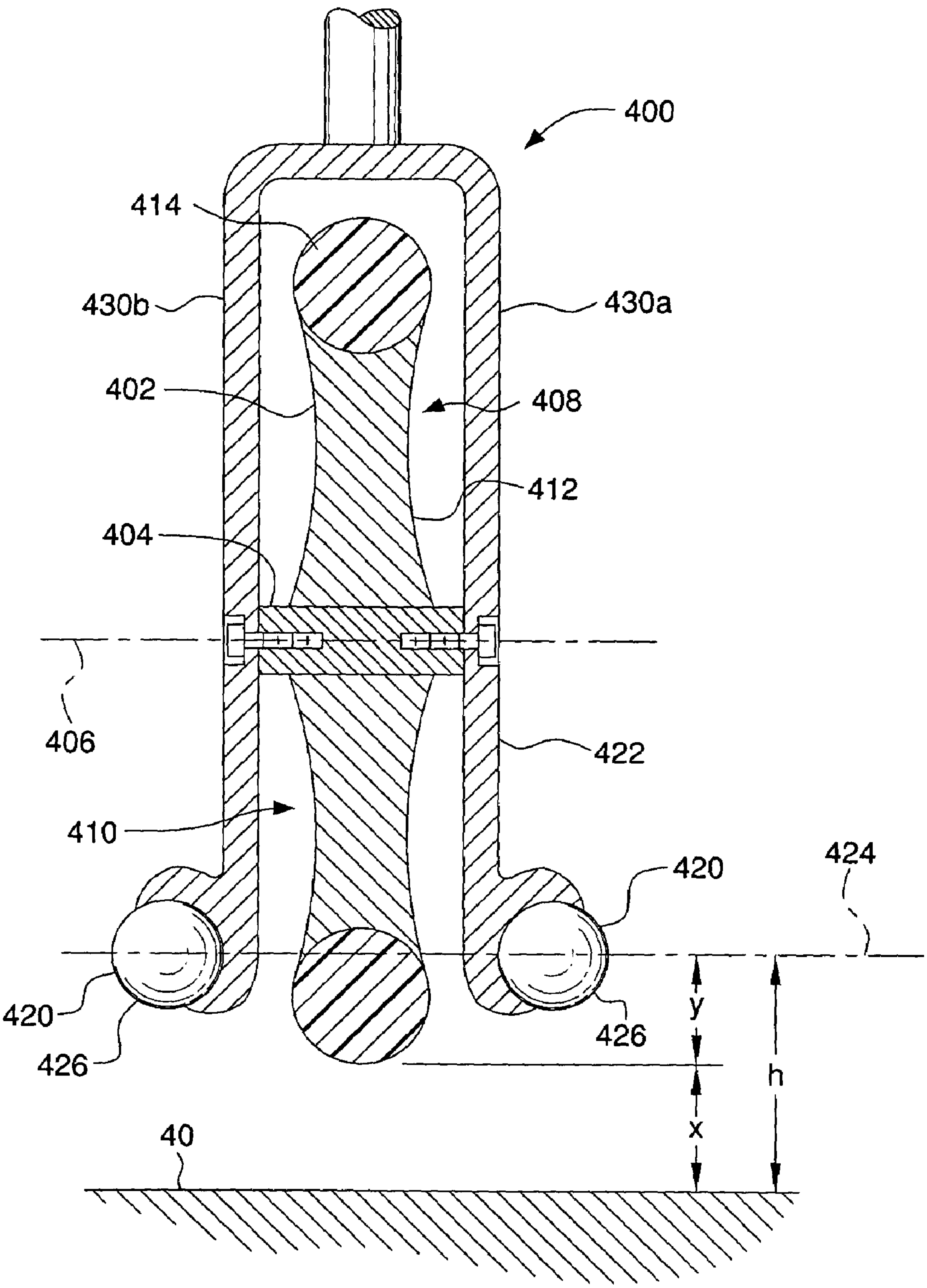
FIG. 8 is a partial cross-sectional view of a fifth preferred embodiment of an anti-tip wheel in accordance with the present invention.
Figure 9:
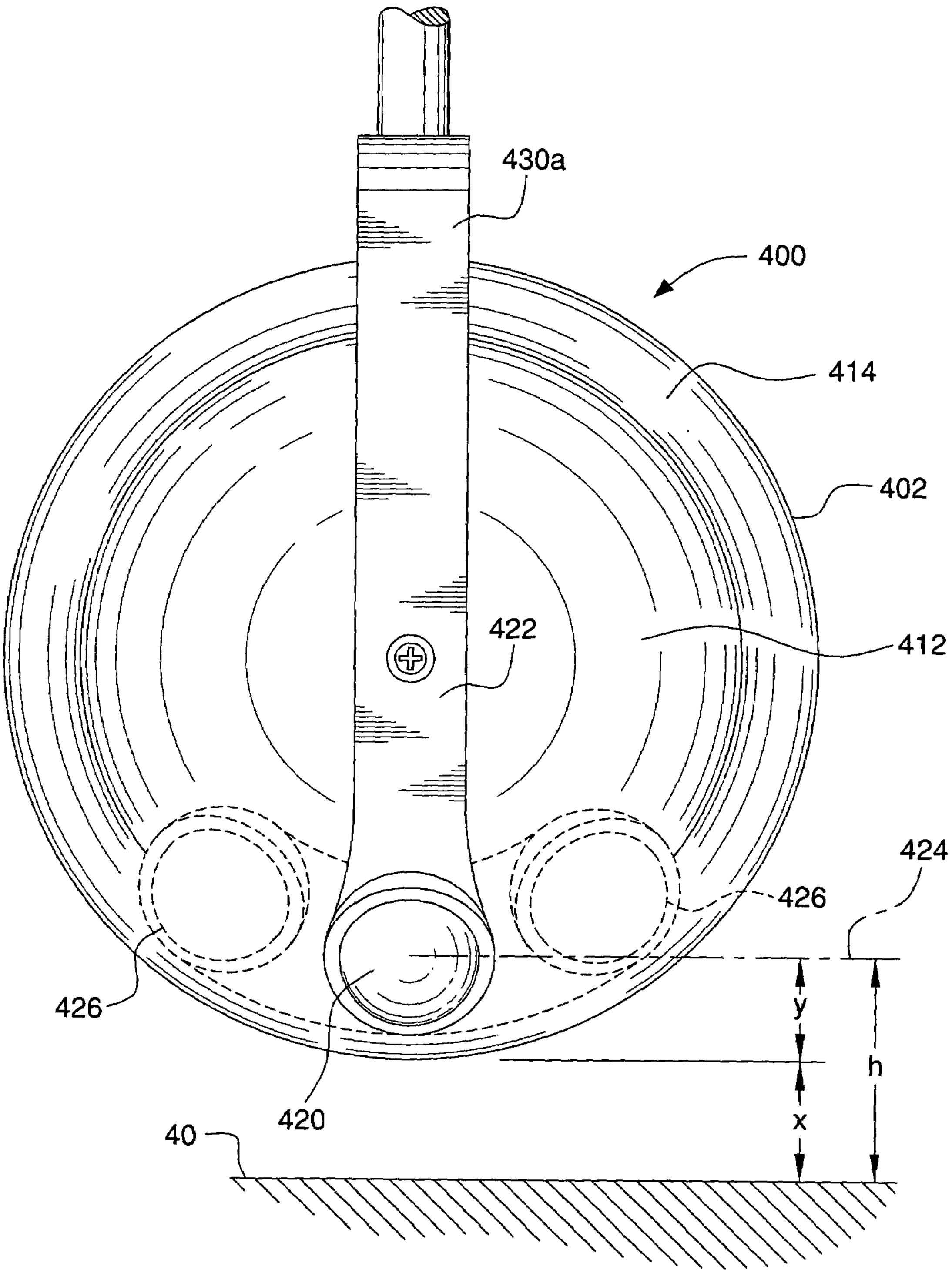
FIG. 9 is a side view of the anti-tip wheel of FIG. 8.

Referring now to FIGS. 8 and 9, a fifth embodiment anti-tip wheel assembly 400 according to the present invention comprises a wheel 402, which may be a conventional anti-tip wheel. The wheel 402 is supported by the wheelchair frame 24 generally and preferably within a fork type mount frame 422 formed by opposing forks 430*a* and 430*b*. Forks 430*a* and 430*b* connect to and support an axle 404 for rotation about a wheel axis of rotation 406. The wheel 402 has first and second sides 408 and 410, respectively. The wheel 402 includes a hub 412 and an outer wheel portion 414 adapted for rolling contact with the supporting surface 40. The fifth embodiment anti-tip wheel assembly 400 further comprises at least a first, and preferably a second, rolling element 420, mounted within forks 430*a* and 430*b*, respectively, for rotation about at least one rolling element axis of rotation. A horizontal rolling element axis of rotation 424 is illustrated.

The fifth preferred embodiment anti-tip wheel assembly 400 may be mounted to the wheelchair 10 such that the anti-tip wheel assembly 400 is elevated above the supporting surface 40. The height of this elevation is shown in FIG. 8 to be elevation height x. The distance between the lowermost extent of the outer wheel portion 414 and the horizontal axis of rotation 424 of the rolling element 420 is a distance y. Thus, the horizontal axis of rotation 424 is positioned above the supporting surface 40 at overall height h, where h=x+y. The overall height h is preferably lower than the height of the wheel axis of rotation 406. Alternatively, in an arrangement not illustrated, the fifth preferred embodiment anti-tip wheel assembly 400 could be mounted for rotation about a generally vertical axis for operation as a caster.

The rolling element 420 has a convex outer surface 426 and is mounted adjacent to and laterally of the anti-tip wheel 402. Preferably, the rolling element 420 is contained entirely within a circular cylindrical envelope having an diameter equal to the wheel diameter and extending laterally from the anti-tip wheel 402 along the axis of rotation 406. In the fifth embodiment, the rolling element 420 is ball-shaped. A plurality of rolling elements 420 may be provided, as indicated in FIG. 9, where a first rolling element 420 is shown in solid lines and second and third rolling elements 420 are shown in phantom lines.

Figure 10:
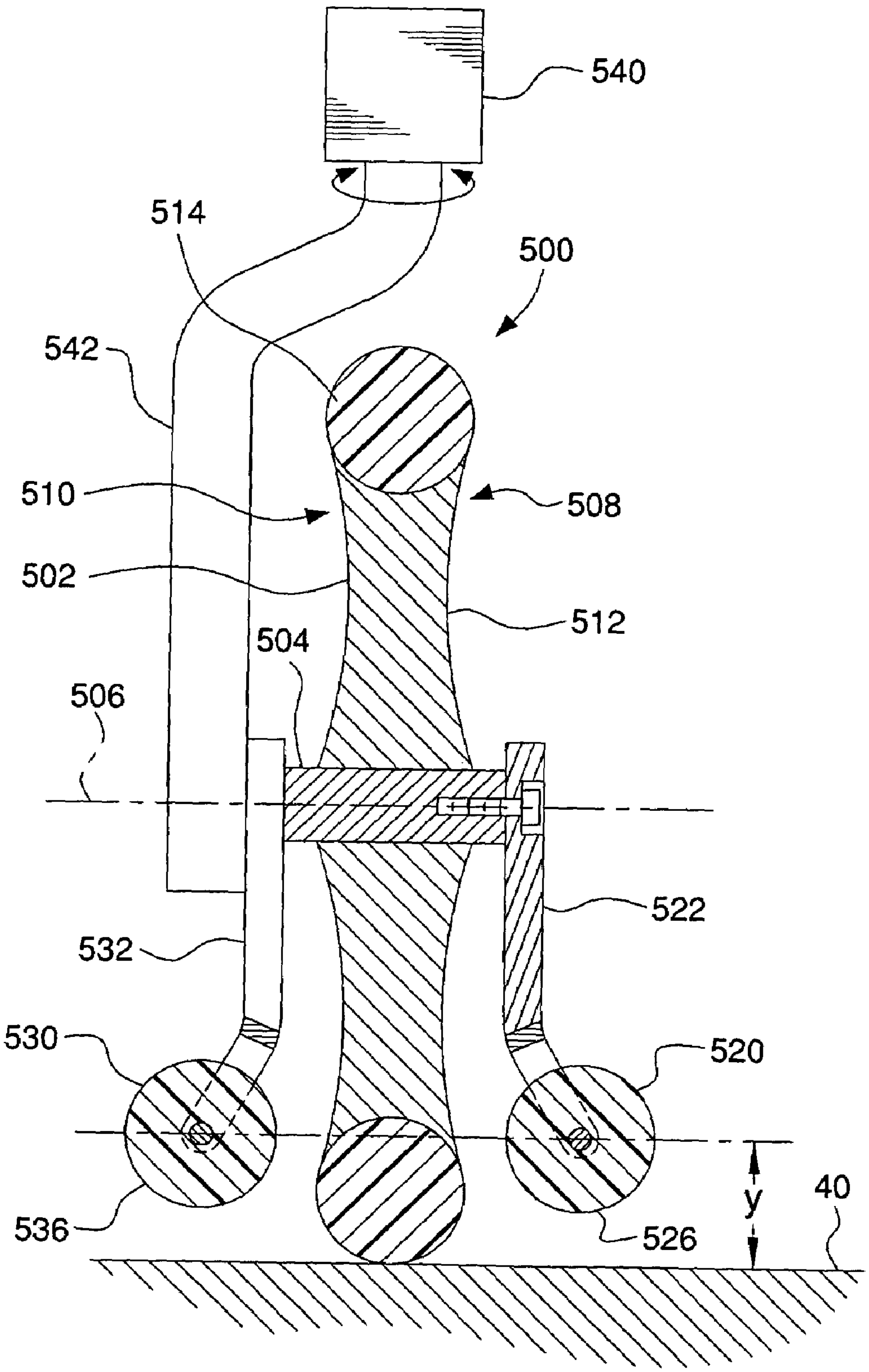
FIG. 10 is a partially schematic, partial cross-sectional view of a sixth preferred embodiment of an anti-tip wheel in accordance with the present invention.
Figure 11:
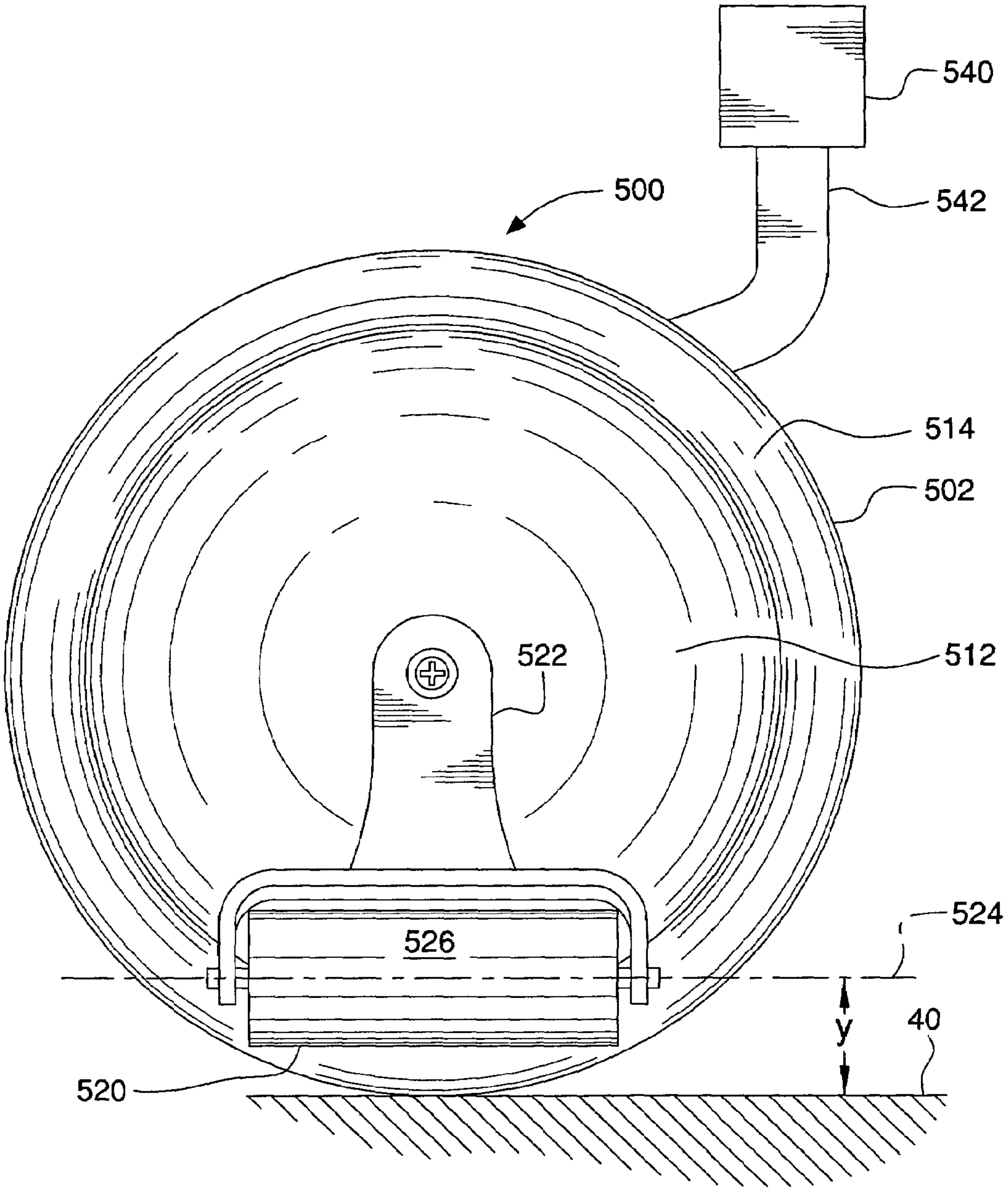
FIG. 11 is a side view of the anti-tip wheel of FIG. 10.

Referring now to FIGS. 10 and 11, a sixth embodiment anti-tip wheel assembly 500 according to the present invention is generally similar to the fifth embodiment, with the exception that first and second rolling elements 520 and 530 are each shaped as a circular cylinder. The sixth embodiment also differs from the fifth embodiment in that the sixth embodiment anti-tip wheel assembly 500 is adapted for operation as a caster. More particularly, a support arm 542 connects at a first end to an axle 504 and support wheel 502 for rotation about a generally horizontal axis of rotation 506. At a second end, the support arm 542 is supported for rotation about a generally vertical axis of rotation by mount 540. A first mount frame 522 supports first rolling element 520, while a generally similar second mount frame 532 supports second rolling element 530.

Other elements of the sixth embodiment are generally similar to corresponding elements of the fifth embodiment. Reference numbers of sixth embodiment elements corresponding to fourth embodiment elements are incremented by 100. For example, sixth embodiment first and second rolling convex outer surfaces 526, 536 correspond to the fifth embodiment rolling element convex outer surface 426. The cylindrical sixth embodiment first rolling element 520 (as well as second rolling element 530) has an axis of rotation 524 which is oriented transverse to the wheel axis of rotation 506.

The height z of an obstacle 42 that the rolling elements 420, 520, 530 can surmount will increase with the diameter of the rolling elements 420, 520, 530. However, as the diameter of the rolling elements 420, 520, 530 increases, the rolling elements 420, 520, 530 will tend to become increasingly awkward, reaching a point where the rolling elements 420, 520, 530 project inconveniently far from the anti-tip wheels 402, 502. The preferred size of the rolling elements 420, 520, 530 is therefore typically a compromise between these considerations. The sixth embodiment rolling elements 520, 530 will be most useful when the wheelchair 10 is approaching an obstacle 42 at an approach angle α shallower than about 45°. The fifth embodiment rolling element 420 is operative over a wider range of approach angles α than the sixth embodiment rolling elements 520, 530.

Figure 12:
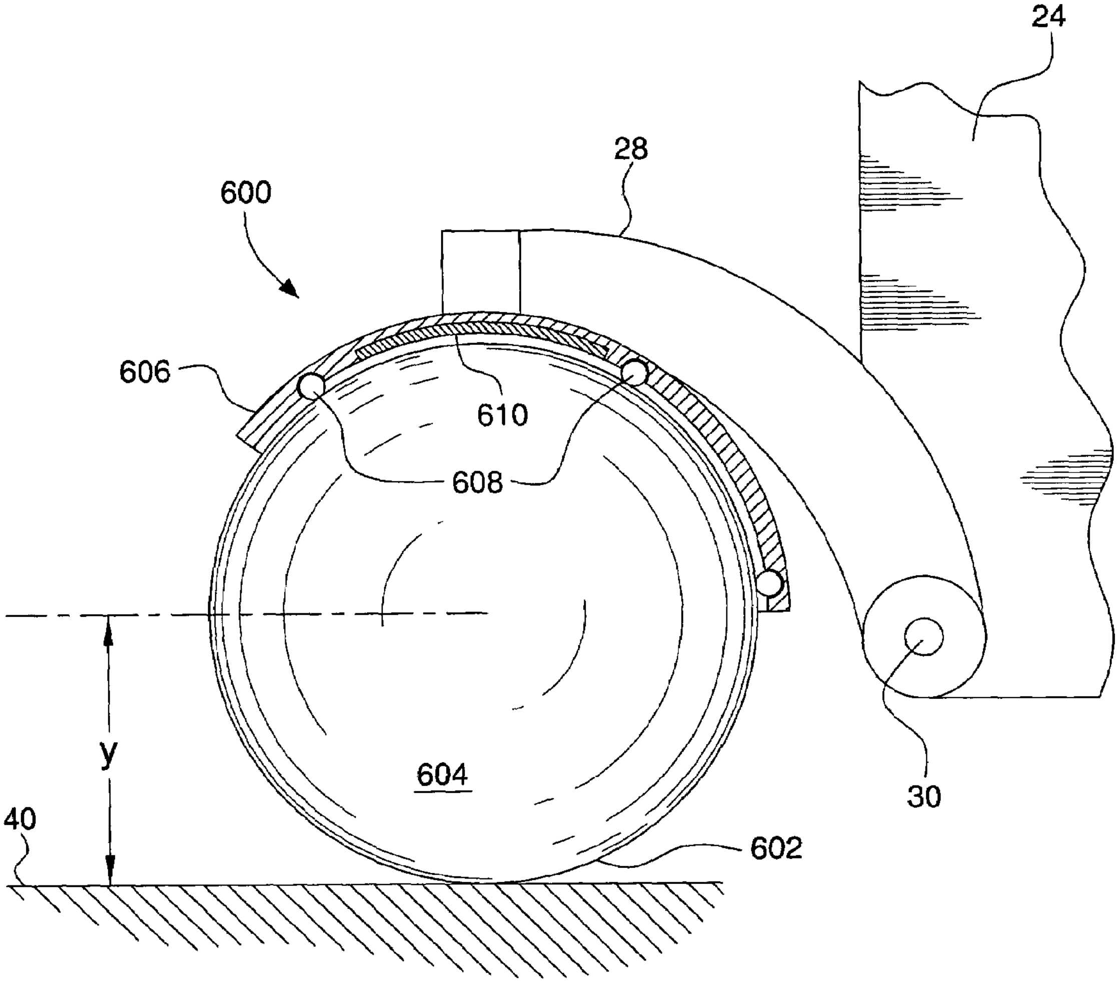
FIG. 12 is a partially schematic, partial cross-sectional view of a seventh preferred embodiment of an anti-tip wheel in accordance with the present invention.

Referring now to FIG. 12, a seventh embodiment anti-tip wheel assembly 600 comprises a ball-shaped anti-tip wheel 602. The ball-shaped anti-tip wheel 602 presents a spherical outer surface 604 to engage an obstacle 42 and to allow the anti-tip wheel 602 to slide and/or roll over the obstacle 42.

The ball-shaped anti-tip wheel 602 is retained by a wheel mount 606 which is connected to the wheelchair frame 24. The wheel mount 606 is preferably connected to support arm 28. As noted above, the support arm 28 may be pivotally connected to the wheelchair frame 24 for pivotal motion about pivot point 30. Bearings 608 are rotatably coupled to the wheel mount 606. The ball-shaped anti-tip wheel 602 is retained within the wheel mount 606 and supported by the bearings 608 for free rotation relative to the wheel mount 606.

The ball-shaped anti-tip wheel 602 is preferably mounted to the wheelchair 10 such that the anti-tip wheel 602 contacts the supporting surface 40 during normal operation of the wheelchair 10. The anti-tip wheel 602 has a radius y.

Preferably, the ball-shaped anti-tip wheel 602 includes a magnetic material and the wheel frame includes one or more magnets 610, and the anti-tip wheel 602 is retained in the wheel mount 606 magnetically. The magnet 610 is affixed to the wheel mount 606, and attracts the anti-tip wheel 602, which is made of ferromagnetic (ferritic or Martensitic) stainless steel or other magnetizable material. Preferably, the anti-tip wheel 602 is fabricated from a thin shell of ferromagnetic stainless steel. Alternatively, a magnet could be placed within the anti-tip wheel 602, interacting with another magnet or with ferromagnetic material in the wheel mount 606. Alternatively, the wheel mount 606 may extend over a sufficient portion of the anti-tip wheel 602 to mechanically retain the anti-tip wheel within the wheel mount 606.

The bearings 608 support the anti-tip wheel 602 for free rotation within the wheel mount 606. The bearings 608 are preferably ball bearings having a sufficiently small diameter such as to allow the anti-tip wheel 602 to be positioned in close proximity to the magnet 610 and thus allow the anti-tip wheel 602 to be securely retained, while also minimizing the strength of the magnet 610. Minimizing the strength of the magnet 610 is desirable to avoid excessive magnetic fields external to the seventh embodiment anti-tip wheel assembly 600.

In use, the seventh preferred embodiment of the anti-tip wheel assembly 600 functions similarly to the first through sixth preferred embodiment anti-tip wheel assemblies 100 through 500. When the outer surface 606 contacts an obstacle 42 at a height z less than the sphere radius y, a corner of the obstacle 42 tends to slide or roll down along the convex (spherical) outer surface 604 as the anti-tip wheel assembly 600 is pushed up and over (or rolls over) the obstacle 42. Thus, interaction of the outer surface 604 and the obstacle 42 facilitates movement of the anti-tip wheel assembly 600 over the obstacle 42.

Provided that the front of the cup is above and behind the foremost point of the anti-tip wheel 602, and provided the pivot point 30 is located below the center of the anti-tip wheel 602 (sphere radius y), the anti-tip wheel assembly 600 can potentially mount an obstacle 42 having a height z equal to or above the radius y of the anti-tip wheel assembly 600. As the wheel support arm 28 pivots upwards (away from supporting surface 40), the anti-tip wheel 602 and the center of the sphere move upwards, allowing the anti-tip wheel 602 to be operable with an obstacle 42 having a greater height z.

Figure 13:
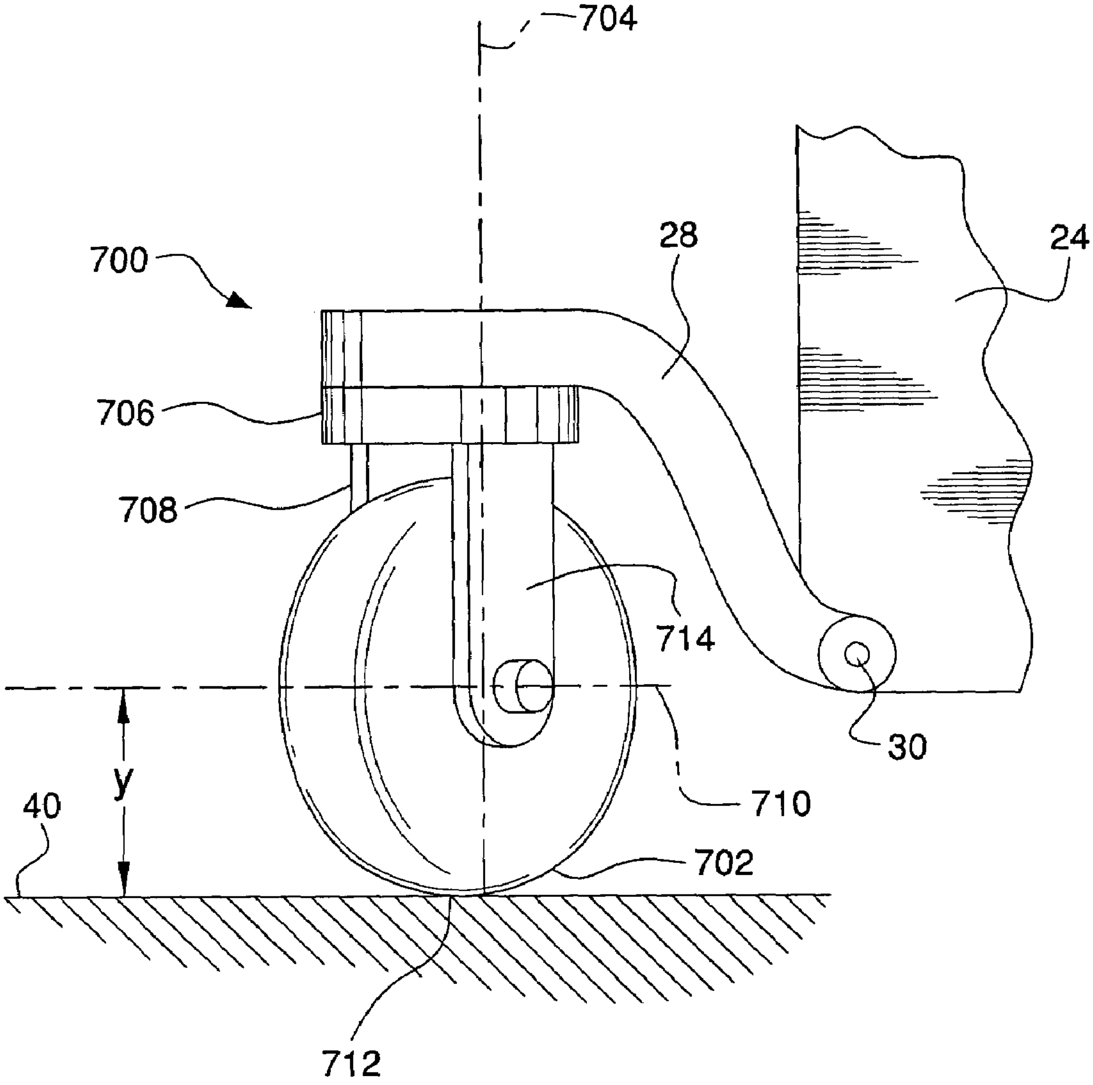
FIG. 13 is a partially schematic side view of an eighth preferred embodiment of an anti-tip wheel in accordance with the present invention.
Figure 14:
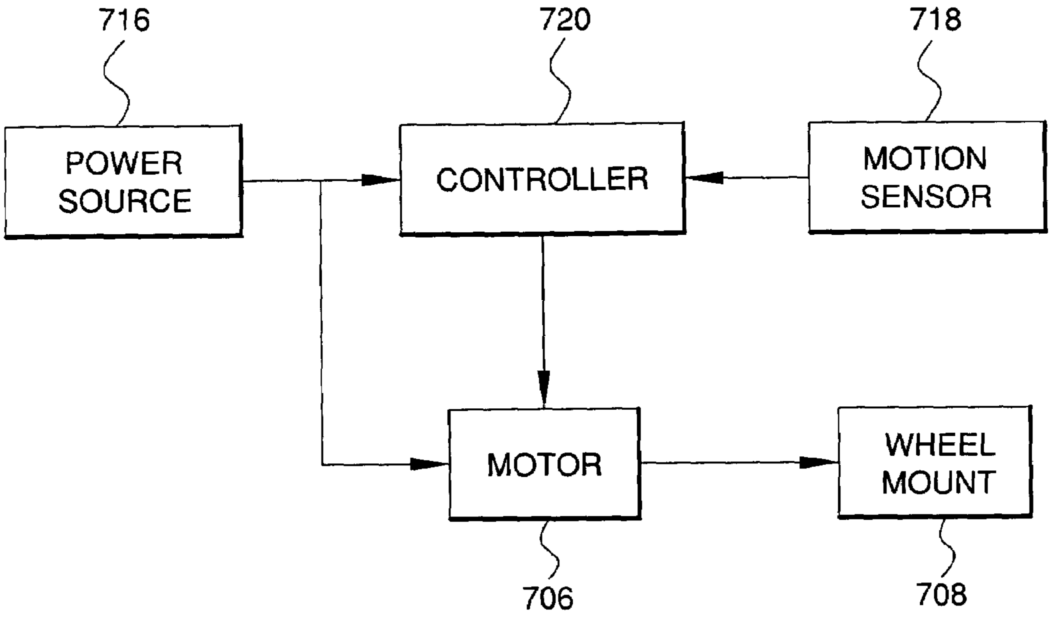
FIG. 14 is a block diagram of electrical, electromechanical, and mechanical elements of a rotation control system used in conjunction with the anti-tip wheel of FIG. 13.

Referring now to FIGS. 13 and 14, an eighth embodiment anti-tip wheel assembly 700 comprises a conventional anti-tip wheel 702 mounted for actively-controlled rotation relative to the wheelchair 10 about a generally vertical axis 704. More particularly, a motor 706 is operatively coupled to a wheel mount 708 such that the wheel mount 708 may rotate about the vertical axis 704. The anti-tip wheel 702 is mounted to the wheel mount 708 by an axle (not shown) for rotation about a generally horizontal axis of rotation 710. The anti-tip wheel 702 includes a curved (curved as seen in a cross sectional plane containing the horizontal axis of rotation 710) outer extent 712, adapted for rolling contact with a supporting surface 40. The wheel mount 708 comprises a pair of forks 714 that are attached to the support arm 28 through the motor 706. The motor 706 is preferably a stepping motor.

The wheelchair 10 is provided with a power source 716. The motor 706 is operatively coupled to the power source 716. A sensor 718 is provided for detecting preferably both motion of the wheelchair and direction of the motion. The sensor 718 is preferably a gyroscopic sensor responsive to rotation of the wheelchair 10. A controller 720 is operatively coupled to the power source 716, sensor 718 and motor 706 to control operation of the motor 706 to control rotation of the wheel mount 708 in response to information received from the sensor 718.

The motor 706 preferably drives the wheel mount 708 through a torsion spring (not shown). The torsion spring (not shown) tends to dampen response of the wheel 702 to operation of the motor 706. This dampening tends to smooth out potentially abrupt operation of the motor 706.

The motor 706 is preferably a flat "pancake" motor, to minimize the vertical height of the device. Such motors are available, for example, from Haydon Switch & Instrument, Inc., Waterbury, Conn. The minimal vertical height of the motor 706 is beneficial both in reducing the change in height in the support arm 28 between the motor 706 and the pivot point 30, and in reducing the overall height and obtrusiveness of the anti-tip wheel assembly 700.

Various techniques are possible for controlling rotation of the anti-tip wheels 706. For example, operation of the motor 706 could be controlled based upon an output of the joystick or other device with which the user operates the wheelchair. A presently preferred technique is to sense the actual movement of the wheelchair 10.

In use, as the user navigates the wheelchair 10, motion of the wheelchair 10 is detected by the sensor 718. A signal from the sensor 718 to the controller 720 allows the controller 720 to control operation of the motor 706 and rotation of the anti-tip wheels 702. In particular, when the user turns the wheelchair 10, the sensor 718 detects the turning motion. Based on information from the sensor 718, the wheels 702 are rotated in the same direction as the turning motion. The rolling surface 712 of the wheels 702 is rotated to face the obstacle 42 such that the rolling surface 712 is in rolling contact with the obstacle 42.

It will be appreciated that, absent active rotational control, the anti-tip wheels 702 illustrated in FIG. 13 will be no better than conventional anti-tip wheels at mounting an obstacle 42 if the wheelchair 10 approaches the obstacle 42 in a straight line at a shallow approach angle α. However, with active rotational control, as the user turns the wheelchair 10 towards the obstacle 42, the anti-tip wheel 702 rotates toward the obstacle 42. As the rolling surface 712 of the anti-tip wheel 702 is rounded, the anti-tip wheel 702 need not contact the obstacle 42 directly perpendicularly to operatively engage the obstacle 42, allowing the wheelchair 10 to climb the obstacle 42.

An advantage of the anti-tip wheel 702 relative to conventional caster wheels is that the anti-tip wheel 702 swivels within a generally circular cylindrical envelope having a cross-sectional area with a diameter equal to the diameter of the wheel 702 itself. In contrast, a conventional caster requires the axis of rotation of the caster wheel to be offset from the axis of swivel or vertical rotation of the caster wheel. This offset is necessary to generate the moment that causes the caster swiveling action. Thus, the radius of the envelope within which the conventional caster swivels is increased above the wheel radius by the amount of this offset.

The present invention may be embodied in other specific forms without departing from the spirit or essential attributes thereof and, accordingly, reference should be made to the appended claims, rather than to the foregoing specification, as indicating the scope of the invention.

Although distinct embodiments have been described, those skilled in the art will understand how features from different embodiments may be combined. For example, the motor 706 and associated rotational control system could be incorporated into the fifth or sixth embodiment anti-tip wheel assemblies 400, 500, respectively.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A wheelchair comprising:

a frame;

a first anti-tip wheel supported by the frame for rotation about an axis of rotation and having an outer portion adapted for rolling contact with a supporting surface and having a first side; and at least a first housing supported by the frame, the first housing partially surrounds the anti-tip wheel, at least a portion of the housing extends laterally beyond the first side, the first housing having a convex outer surface with a vertex positioned at a first height and an outer perimeter proximate the wheel outer portion, and a portion of the convex outer surface proximate the outer perimeter defines a tangent line to both the portion of the outer surface and an outer extent of the wheel such that when the first housing contacts an obstacle at a height less than the first height, interaction of the outer surface with the obstacle facilitates movement of the wheel over the obstacle, and further comprising a second housing supported by the frame and the first anti-tip wheel having a second side, wherein the second housing partially surrounds the anti-tip wheel, at least a portion of the second housing extends laterally beyond the second side, the second housing includes a convex outer surface with a vertex positioned at the first height and an outer perimeter proximate the wheel outer portion, and a portion of the outer surface proximate the outer perimeter defines a tangent line tangent to both the portion of the outer surface and an outer extent of the wheel such that when the second housing contacts an obstacle at a height less than the first height, interaction of the outer surface with the obstacle facilitates movement of the wheel over the obstacle.

2. The wheelchair of claim 1 further comprising first and second lateral sides with the first anti-tip wheel disposed on the first lateral side of the wheelchair and a second anti-tip wheel disposed on the second lateral side of the wheelchair.

3. The wheelchair of claim 1, wherein the anti-tip wheel is supported on a support arm positioned forward of the wheelchair frame, the anti-tip wheel positioned not in contact with supporting surface, upon which the wheelchair rides, when in a normal operative position.

4. The wheelchair of claim 1, wherein the first anti-tip wheel is mounted for rotation about a second axis of rotation generally perpendicular to the axis of rotation for rolling engagement with a supporting surface such that the anti-tip wheel functions as a caster.

5. The wheelchair according to claim 1, wherein the first anti-tip wheel is pivotally connected to the frame by a support arm.

6. A wheelchair comprising:

a frame;

at least one anti-tip wheel supported by the frame for rotation about a first wheel axis of rotation; and at least one rolling element supported by the frame for rotation about at least one rolling element axis of rotation positioned at a first height, the rolling element having a convex outer surface and mounted adjacent to and laterally of the at least one anti-tip wheel;

wherein when the outer surface engages an obstacle having a height less than the first height, interaction of the outer surface with the obstacle facilitates movement of the wheel over the obstacle, and wherein the rolling element is ball-shaped.

7. The wheelchair of claim 6, wherein the frame comprises first and second lateral sides, and a first anti-tip wheel disposed on the first lateral side of the frame and a second anti-tip wheel disposed on the second lateral side of the frame.

8. The wheelchair of claim 6, wherein the anti-tip wheel is supported on a support arm mounted on the frame and extending forwardly from the frame, the anti-tip wheel positioned not in contact with a supporting surface, upon which the wheelchair rides, in a normal operative position.

9. The wheelchair of claim 6, wherein the anti-tip wheel is mounted for rotation about a second axis of rotation generally perpendicular to the first wheel axis of rotation such that the anti-tip wheel functions as a caster.

10. A wheelchair comprising:

a frame;

at least one anti-tip wheel supported by the frame for rotation about a first wheel axis of rotation; and at least one rolling element supported by the frame for rotation about at least one rolling element axis of rotation positioned at a first height, the rolling element having a convex outer surface and mounted adjacent to and laterally of the at least one anti-tip wheel, wherein when the outer surface engages an obstacle having a height less than the first height, interaction of the outer surface with the obstacle facilitates movement of the wheel over the obstacle, and wherein the anti-tip wheel does not contact a supporting surface for the wheelchair, upon which the wheelchair rides, in a normal operative position and the supporting surface is level.

11. The wheelchair of claim 10, wherein the frame comprises first and second lateral sides, and a first anti-tip wheel disposed on the first lateral side of the frame and a second anti-tip wheel disposed on the second lateral side of the frame.

12. The wheelchair of claim 10, wherein the anti-tip wheel is mounted for rotation about a second axis of rotation generally perpendicular to the first wheel axis of rotation such that the anti-tip wheel functions as a caster.

13. A wheelchair comprising:

a wheelchair frame;

a pair of wheels for propelling the wheelchair, the wheels rotatably connected to the frame;

a ball-shaped anti-tip wheel, constructed at least partially of a magnetic material; and a wheel mount connected to the wheel chair frame, the wheel mount having a magnet;

wherein the ball-shaped anti-tip wheel is rotatably positioned in the wheel mount, and the anti-tip wheel is retained in the wheel mount by the magnet.

14. A wheelchair comprising:

a wheelchair frame;

a power source;

at least a first anti-tip wheel assembly supported by the wheelchair frame, including:

a wheel frame mounted for rotation about a generally vertical axis;

a wheel mounted in the wheel frame for rotation about a generally horizontal axis; and a motor operatively coupled to the power source and to the wheel frame for rotation of the wheel frame;

a sensor for detecting motion of the wheelchair and direction of the motion; and a controller operatively coupled to the power source, sensor and motor to control operation of the motor to control rotation of the wheel frame in response to information received from the sensor.

15. The wheelchair of claim 14, wherein the motor is a stepping motor.

16. The wheelchair of claim 14, wherein the sensor is a gyroscopic sensor responsive to turning of the wheelchair.

17. The wheelchair of claim 14 further comprising first and second lateral sides with the first anti-tip wheel assembly disposed on the first side and a second anti-tip wheel assembly disposed on the second side.

* * * * *